Jan. 21, 1930.   J. G. VINCENT   1,744,182
AUTOMATIC TRANSMISSION MECHANISM
Filed Sept. 6, 1924   3 Sheets-Sheet 1
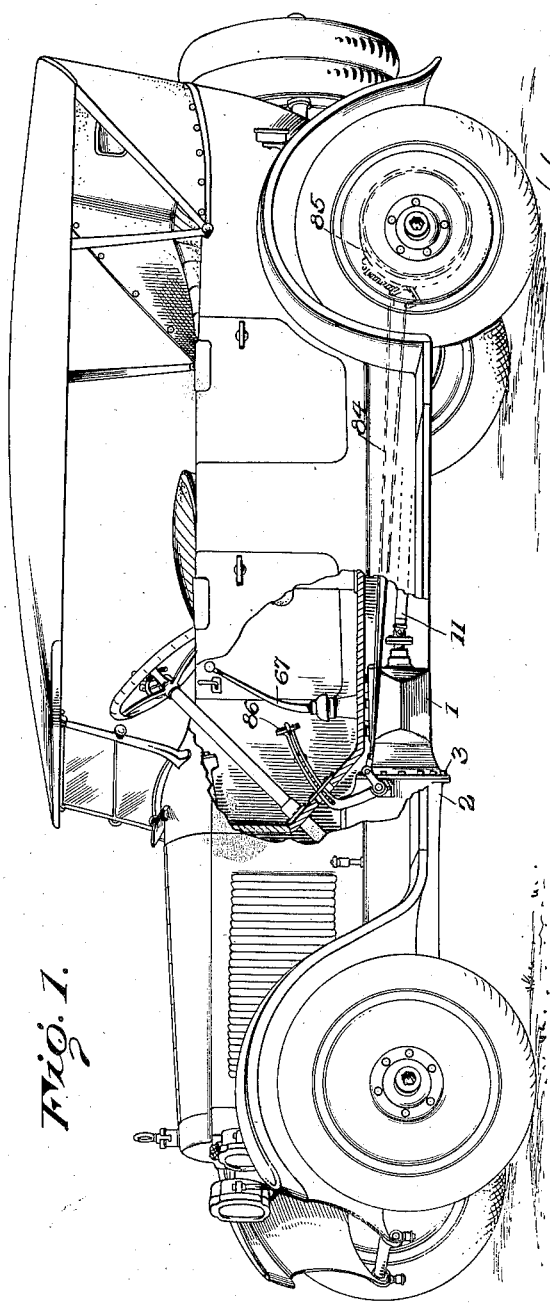
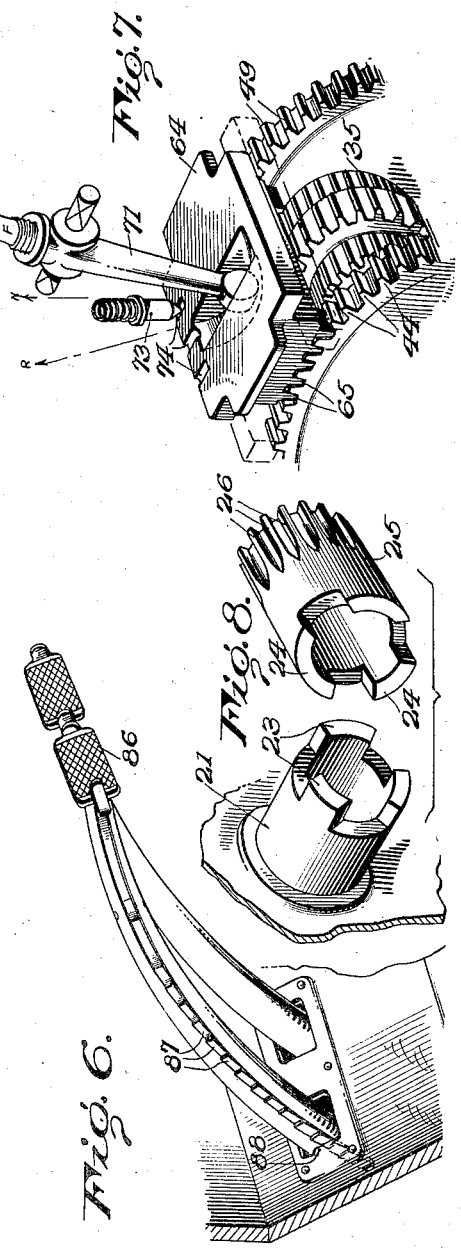
INVENTOR
Jesse G Vincent
BY
Mauro, Cameron, Lewis & Kerkam
ATTORNEYS Jan. 21, 1930.	J. G. VINCENT	1,744,182
AUTOMATIC TRANSMISSION MECHANISM
Filed Sept. 6, 1924   3 Sheets-Sheet 2

Fig. 2.

INVENTOR
Jesse G. Vincent
BY
Mauro, Cameron, Lewis & Kerkam
ATTORNEYS

Jan. 21, 1930.  J. G. VINCENT  1,744,182
AUTOMATIC TRANSMISSION MECHANISM
Filed Sept. 6, 1924  3 Sheets-Sheet 3
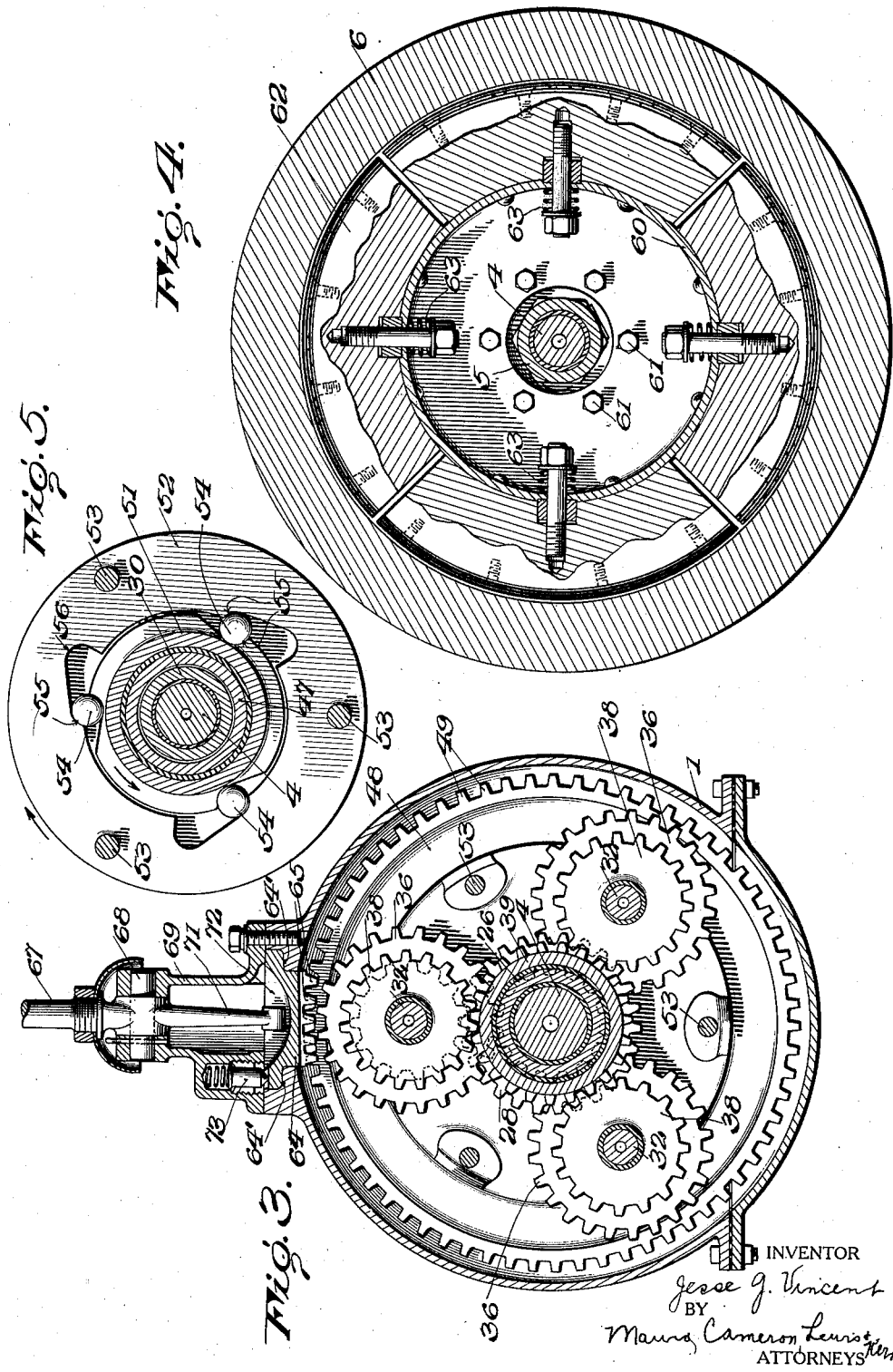
INVENTOR
Jesse G. Vincent
BY
Maurs Cameron Lewis
ATTORNEYS Patented Jan. 21, 1930

1,744,182

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

AUTOMATIC TRANSMISSION MECHANISM

Application filed September 6, 1924. Serial No. 736,329.

This invention relates to a power transmitting mechanism of the automatic change speed type.

It has heretofore been proposed to provide an automatic transmission mechanism embodying centrifugally actuated members, such as clutch sectors, which automatically move into driving engagement at predetermined speeds. Planetary gearing has also been proposed as a means for transmitting power from the centrifugal members to the driven shaft. So far as I am aware, however, these devices have not been commercially practical for several reasons, i. e., the parts have been extremely difficult to assemble; it has been necessary in order to replace worn parts or reline the clutch members to dismantle the entire mechanism; no means have been available for thoroughly lubricating the parts; and skilled mechanics are required to service the devices. A further serious difficulty in the manufacture and use of these automatic transmissions has resulted from the necessity of employing brake bands for holding certain parts against rotation in order to properly transmit the power. These bands require frequent adjustments and relining. Moreover, they are subject to slippage and consequent loss of power.

The present invention overcomes the above difficulties by providing an automatic transmission mechanism so constructed that its elements may be readily assembled and disassembled; by providing a pressure oiling system that insures proper lubrication of all moving parts; and by providing means for positively locking certain parts against rotation in order that power may be positively transmitted to the driven shaft, and the direction of rotation of the latter may be controlled by a single member.

A further object is to provide, in combination with an automatic transmission that is particularly adapted for use on motor vehicles a suitable control lever, service brakes and standing or emergency brakes.

The invention will be readily understood by reference to the accompanying drawings, illustrating one embodiment of the inventive idea, and wherein Fig. 1 is a perspective view with parts broken away, of a motor vehicle embodying the present invention;

Fig. 2 is a sectional side elevation of my improved automatic transmission mechanism;

Figs. 3 and 4 are sectional views taken on lines 3—3 and 4—4, respectively of Fig. 2;

Fig. 5 is an end view, partly in section, illustrating a clutch mechanism that may be employed;

Fig. 6 is a perspective detail of the brake pedals;

Fig. 7 is a perspective detail of a portion of the control lever and the positive locking means that is preferably employed in the device, and Fig. 8 is a perspective detail illustrating one manner in which the hub of the low speed clutch drum may be formed.

Referring to the drawings, wherein like reference numerals refer to like parts throughout the several views, 1 is the housing of my improved automatic transmission mechanism which is secured at its forward end to the fly wheel housing 2 by means of bolts 3. Rotatably supported in housing 1 is a transmission shaft 4 having its forward end journaled in a spigot bearing 5 formed in the hub of a flywheel 6 that is secured by bolts 7 to the after flanged end of the engine crank shaft 8. The projecting rear end of shaft 4, which is supported by a bearing 9, is grooved to receive a splined, universal-joint member 10, whereby shaft 4 may be connected to the usual drive shaft 11.

Secured to the rear face of flywheel 6 by bolts 12 is a low speed clutch spider 13 having a rearwardly extending hub portion 14 to which are attached, by means of pins 15, a plurality of low speed clutch sectors or shoes 16. Springs 17, which surround pins 15 between the heads of the latter and the inner periphery of hub 14, oppose radial movement of shoes 16, but at a predetermined speed of flywheel 6, said shoes, which are provided on their outer peripheries with suitable friction material or lining 18, move radially into engagement with the inner surface of the flange 19 of a clutch drum 20 provided with a hub 21 that is journaled on a bearing 22 on shaft 4.

The clutch hub 21 is provided at its rear end with clutch jaws 23 that engage similar jaws 24 formed in the hub 25 of a gear 26 that is journaled on a bearing 27 on shaft 4. The rear end of bearing 27 is axially positioned by engagement with the forward face of a gear 28 that is preferably formed integral with shaft 4. Clutch jaws 23 and 24 are in engagement at all times in order that clutch drum 20 and gear 26 will always rotate in unison. If the clutch jaws were omitted and hubs 21 and 25 were formed integrally it would be impossible to assemble the parts.

Mounted on shaft 4, immediately rearward of gear 28, is a bearing 29 on which is rotatably mounted the rearwardly extending hub 30 of a planet gear spider 31. Into the latter are threaded, or otherwise suitably secured, a plurality of journal pins 32 which are secured at their forward ends in a companion spider 33 that is rotatably mounted on a bearing 34. A cluster of three integrally formed planet gears 35 is rotatably mounted on each of the pins 32, and the center gear 36 of said cluster is in constant engagement with gear 26. The after gear 37 of each cluster is in continuous engagement with gear 28, formed on shaft 4, while the third and forward gear 38 is at all times in mesh with a gear 39 formed integral with a forwardly extending sleeve 40 that is rotatively mounted on a bearing 41 positioned on hubs 21 and 25. Rigidly secured to sleeve 40, as by means of a key 42, is a disk gear 43, provided with peripheral teeth 44, and having a rearwardly extending hub 45 on which is mounted the bearing 34. Sleeve 40 and hub 45 are separately formed and keyed together to permit of assembly.

Interposed between bearing 9 and housing 1 is a bearing retainer 46 provided with a forward extension 47 on which is rotatably mounted a second disk gear 48 provided on its periphery with radial teeth 49. Any suitable type of bearing 50 is interposed between retainer extension 47 and the hub 51 of gear 48. The forward portion of hub 51 forms the inner element of an overrunning ball clutch (see Fig. 5), the outer element being constituted by a ring 52 secured to the rear face of planet spider 31 by bolts 53 which preferably extend through both of the planet spiders 31 and 33. Between the clutch elements 51 and 52 are a plurality of clutch balls 54 which seat, in one direction of rotation, against shoulders 55 formed in elements 51 and 52, but which drop into recesses or pockets 56 formed in ring 52 in the opposite direction of rotation.

Rigidly attached in any suitable manner to the forward portion of transmission shaft 4 and intermediate spigot bearing 5 and clutch drum hub 21, is a flanged hub member 57 which is axially positioned by means of a spacer 58 that has its rear face in engagement with the forward flanged end of bearing 22. Forward axial movement of hub 57 is prevented by means of a nut 59 threaded onto shaft 4 and a suitable lock washer 59'. A high speed clutch drum 60 is attached by means of bolts 61 to the flange of hub 57. Resiliently and movably mounted on the rim of drum 60, in a manner similar to that described in connection with the low speed clutch spider 13, are a plurality of centrifugally actuated clutch shoes or sectors 62 of any suitable type. The springs 63, that are employed for controlling the radial movement of shoes 62, are adapted to yield to centrifugal force when transmission shaft 4 rotates at a predetermined speed.

Slidably mounted on shoulders 64' formed in the top of transmission housing 1 is a locking member or block 64 that is provided on its lower surface with a forward set of teeth 65, which are adapted to engage the teeth 44 of disk gear 43, and a rear set of teeth 66 that are adapted to be moved into mesh with the teeth 49 of disk gear 48. The sets of teeth 65 and 66 are so spaced that it is impossible for both sets to be simultaneously in engagement with the teeth of the respective disk gears.

In order that block 64 may be longitudinally moved to lock either gear 43 or gear 48 against rotation, there is provided a control lever 67 that is pivoted as at 68 to a cover plate 69 of any suitable form, the latter being secured by bolts 70 to the upper surface of transmission housing 1. The lower end 71 of lever 67 extends into a pocket 72 formed in the supper surface of block 64.

In order to prevent accidental shifting of block 64, a spring detent 73 is mounted in cover 69, which detent is adapted to selectively engage one of three notches 74, formed in the upper surface of block 64 (Fig. 7) and thus resiliently lock the latter in ahead, neutral or reverse position.

The bearings of the transmission mechanism are adapted to be lubricated by oil under pressure, the oil being taken from the pressure oiling system of the engine. To this end a radial duct 75 is provided in the rear main journal of shaft 8, which duct is in communication, in the usual or any suitable manner, through a passage 76 in the bearing 77, with the pressure side of a lubricating force feed pump 78. While the latter is illustrated as being of the gear type and located directly below the rear main bearing 77, it will be understood that this is a diagrammatic showing only, and that pump 78 may be of any suitable type and may be mounted in any desired position. Duct 75 communicates with a rearwardly extending axial duct 79, formed in shaft 8, which registers with a similar passage 80 formed in transmission shaft 4. The connection between ducts 79 and 80 is formed by the spigot bearing 5 in the plane of flywheel 6. Extending radially from passage 80 are a plurality of ducts 81ª, 81ᵇ, 81ᶜ, 81ᵈ, for conducting the oil to the various concentric bearings. One manner in which these radial ducts may be formed is illustrated in Fig. 2. As shown, oil forced to bearing 22 passes through a radial passage 22′ therein, a radial passage 21′ in hub 21, a passage 45′ in hubs 40 and 45, bearing 34, and spider 33 to journal pins 32. Passage 80 preferably terminates approximately in the plane of disc gear 48 and one of the radial passages, 81ᵈ, adjacent the rear end supplies lubricant to bearing 29 for spider 31. Hub 30 of this spider is provided with a radial passage 30′ in order that oil may be forced to the rear bearing 9 of shaft 4. Other radial oil passages are provided where necessary. Oil from the lubricated parts drains back to the engine crank case through a passage 82 adjacent the bottom of the transmission housing. The rear end of shaft 4 is preferably provided with an oil baffle 83 of any desired type to prevent leakage at this point.

*Operation.*—The parts being in the position illustrated in Fig. 2, with the control lever 67 and block 64 in neutral position, if the engine is idling at low speed none of the transmission elements are rotated except the low speed clutch spider 13 and low speed clutch shoes 16 which at this time are prevented from radial movement by means of springs 17. When the engine is speeded up, centrifugal force causes shoes 16 to move radially against the tension of springs 17 into driving engagement with the inner surface of the flanged portion 19 of clutch drum 20, thus rotating the latter. This movement is transmitted by clutch teeth 23 and 24 to gear 26 and planet gears 35. Gear 28, being stationary because of its connection to the loaded transmission shaft 4, the planetary gearing mechanism including disk gears 43 and 48, revolves around shaft 4. No power is transmitted to the shaft 4 or drive shaft 11 at this time. If, however, before speeding up the engine, control lever 67 is moved forwardly, thus forcing teeth 66 into locking engagement with teeth 49, rotation of disk gear 48 will be prevented when the clutch shoes 16 are caused to engage clutch drum 20 by speeding up the engine. The locking of disk gear 48 results in the planet cage being held against rotation by means of the ball-clutch elements and the rotation imparted to gears 36 by the gear 26 will be transmitted through gears 37 and 28 to transmission shaft 4, and the vehicle will be driven in the forward direction. As the engine speed is increased, the vehicle speed and consequently the speed of rotation of shaft 4, is also increased. At a certain predetermined speed, centrifugal force acting on clutch shoes 62 causes them to move radially, against the tension of spring 63, into engagement with the inner periphery of flywheel 6, thus establishing a direct drive from said flywheel to shaft 4. All of the rotative parts in the transmission housing then revolve together with the exception of disk gear 48 which is locked against rotation by teeth 66. Clutch balls 54 move into the pockets 56, thus permitting clutch ring 52 to rotate relative to hub 51 and allow the planet cage to travel forward at an increased speed. When the forward movement of the vehicle is slowed for any reason below a predetermined speed the clutch shoes 62 will move inwardly from engagement with flywheel 6 under the influence of springs 63, whereupon transmission of power is automatically shifted to the low speed clutch elements and the planetary gearing.

It will thus be apparent that the brake and the automatic clutches cooperate with each other to secure the most efficient relation between engine speed and car speed at all times, and to prevent stalling the engine under any circumstances. If a vehicle is traveling down a steep grade, for example, or for other reasons, the speed of the vehicle and of the driven shaft may become such that the high speed clutch members 62 will engage the flywheel 6, thus connecting the engine directly to the driven shaft in high gear. By actuating brake pedal 86, the speed of the driven shaft may be reduced to and maintained at such a point that the high speed clutch shoes remain disengaged from the flywheel and the vehicle operates continuously in low gear.

If it is desired to back the vehicle, the direction of rotation of shaft 4 may be reversed by moving control lever 67 rearwardly until the teeth 65 on block 64 are brought into mesh with the teeth 44 of disk gear 43. Gear 39 is then held against rotation, due to its rigid connection with gear 43, and the planetary cage rotates about gear 39 in the reverse direction to the normal movement of rotation of disk gear 48. If the vehicle is driven in reverse fast enough to cause the high speed clutch shoe 62 to engage flywheel 6, the engine will be stalled, since shaft 4 is now rotating in a direction opposite to that of the flywheel.

The use of my improved automatic transmission mechanism greatly simplifies the operation and control of a motor vehicle and results in a novel and simple arrangement of the control lever and the brakes. The control lever is adapted to have only three positions and the use of a clutch pedal, as such, is entirely eliminated. Preferably, the clutch pedal is employed for actuating the emergency or standing brakes, as is illustrated in Figs. 1 and 6. The brake rods 84 leading from the emergency brakes 85 are connected in any suitable manner to the clutch pedal 86 and any desired type of ratchet mechanism 87 may be employed for retaining the emergency brake pedal 86 in depressed position for maintaining the standing brake bands 85 in braking engagement with the brake drums. A slight lateral movement of the brake pedal will disengage the ratchet from a locking tooth 88 and permits the usual spring (not shown) to return brake pedal 86 to normal position.

If it becomes necessary to reline clutch shoes 16 and 62, the operation may be performed without the difficulties that have heretofore been encountered in devices of this type. The connection between transmission shaft 4 and drive shaft 11 may be broken at the universal joint at 10. By removing bolts 3, housing 1 may be slid rearwardly to give access to bolts 12. Removal of the latter enables the mechanism to be lifted out as a unit, since the forward end of shaft 4 may be easily withdrawn from spigot bearing 5. The high speed clutch shoes 62 may now be relined without further disassembly, and if it is desired to reline low speed shoes 16 it is only necessary to remove clutch drum 60 by withdrawing bolts 61. The ease with which the device may be serviced renders it commercially practical, and such a result has not heretofore been possible.

While the automatic transmission heretofore described is shown in association with an automobile, it will be understood that the same is adapted for other uses and purposes; and while, for the sake of clearness, one expression of the inventive idea has been illustrated and described in detail, it is to be understood that the invention is not limited thereto, but that the inventive idea is susceptible of various mechanical expressions within the limits of the appended claims.

What is claimed is:—

1. A device of the class described comprising in combination with a power shaft and a flywheel thereon, centrifugal members actuated by said flywheel, power transmission means including planetary gearing adapted to be driven from said members, a cage for said gearing, a disk gear, a clutch for connecting said disk gear to said cage, a toothed member adapted to be moved into mesh with said disk gear for positively locking the latter against rotation, and a shaft adapted to be driven through said planetary gearing.

2. In combination with a vehicle, an internal combustion engine, a driven shaft, automatic means for directly connecting said engine and shaft, automatic means for indirectly connecting said shaft and engine whereby said vehicle may be driven at high and low speeds respectively, and means for checking the speed of said driven shaft when said direct connection is in operation whereby said indirect connection is brought into action, said last named means including a brake pedal and means for retaining said pedal in braking position.

3. In combination with a vehicle, an internal combustion engine, a driven shaft, automatic means for directly connecting said engine and shaft, automatic means for indirectly connecting said shaft and engine whereby said vehicle may be driven at high and low speeds respectively, and means for checking the speed of said driven shaft when said direct connection is in operation whereby said indirect connection is brought into action, said last named means including a pair of brake pedals, and means for retaining one of said pedals in braking position.

4. A transmission unit comprising a housing, a shaft mounted therein, a low speed clutch drum mounted on said shaft, a plurality of low speed clutch shoes for said drum, power transmission means including planetary gearing interposed between said drum and shaft, a hub removably secured to said shaft, a high speed clutch spider removably secured to said hub, and a plurality of high speed clutch shoes carried by said spider, said low speed clutch shoes being rendered accessible for relining by the removal of said spider.

5. A power transmission mechanism for motor vehicles comprising in combination with a power shaft and a flywheel, centrifugally actuated members carried by said flywheel, a clutch drum adapted to be engaged by said members at a predetermined speed of rotation of said flywheel, a driven shaft, a sun gear rotatable thereon, clutch teeth for rigidly and detachably connecting said gear to said drum, a planet gear operatively engaging said sun gear, and means for transmitting power from said planet gear to said driven shaft.

6. A device of the class described comprising in combination with a power shaft and a flywheel thereon, a driven shaft, means interposed between said flywheel and driven shaft for rotating the latter including a sun gear operatively connected to said flywheel and cooperating planet gears operatively connected to said driven shaft, a hub removably secured to said driven shaft, a clutch spider removably secured to said hub, and a plurality of high speed clutch shoes carried by said spider and adapted to move radially into engagement with said flywheel, the forward end of said driven shaft being journalled in the hub of said flywheel.

7. A device of the class described comprising in combination with a power shaft and a flywheel thereon, centrifugal clutch means actuated by said flywheel, a sun gear operatively connected with said means, planet gears operatively engaging said sun gear, a driven shaft, means connecting said driven shaft with said planet gears, and means positively locking said planet gears against rotation around said sun gear in one direction, but allowing free rotation thereof in the opposite direction.

8. A device of the class described, comprising in combination with a power shaft and a flywheel thereon, a plurality of low speed clutch shoes actuated by said flywheel, a clutch drum adapted to be engaged by said shoes, a sun gear operatively connected to said drum, planet gears cooperating with said sun gear, a driven shaft, means operatively connecting said driven shaft to said planet gears, means for positively locking said planet gears against rotation around said sun gear, a clutch spider removably secured to said driven shaft, and a plurality of high speed clutch shoes carried by said spider and adapted to engage said flywheel.

9. A device of the class described, comprising in combination with a power shaft and a flywheel, a plurality of low speed clutch shoes actuated by said flywheel, a clutch drum adapted to be engaged by said shoes, a driven shaft, a sun gear rotatable thereon, clutch teeth for rigidly and detachably connecting said gear to said drum, planet gears cooperating with said sun gear, gear means operatively connecting said planet gears with said driven shaft, a clutch spider removably secured to said driven shaft, a plurality of high speed clutch shoes carried by such spider and adapted to engage said flywheel, and means including a one-way clutch for positively locking said planet gears against rotation in one direction around said sun gear.

10. A power transmission mechanism for motor vehicles comprising in combination with a power shaft and a flywheel, a clutch drum rotatably mounted adjacent said flywheel, centrifugally actuated clutch members carried by said flywheel within said drum and adapted to coact therewith at a predetermined rotational velocity of the flywheel, a gear rotatably mounted coaxial with the drum and having a toothed clutch connection therewith, detachable means for mounting the centrifugal clutch members on the flywheel, and detachable means rendered accessible by the removal of the clutch members from the flywheel for retaining the drum clutched to said gear.

11. A device of the class described comprising in combination with a power shaft and a flywheel thereon, a driven shaft, planetary reduction gearing interposed between said flywheel and driven shaft for rotating the latter, including a sun gear adapted to be rotated by the flywheel, planet gears connected to the driven shaft and control means for said planetary gearing, a hub removably secured to said driven shaft, a clutch spider removably secured to said hub, and a plurality of high speed clutch shoes carried by said spider and adapted to move radially into engagement with said flywheel at a predetermined speed of said driven shaft, the forward end of said driven shaft being journaled in the hub of said flywheel.

12. A device of the class described comprising in combination with an internal combustion engine having a flywheel, a driven shaft, a spigot bearing formed on said flywheel and adapted to removably support one end of said driven shaft, and means for transmitting power from the flywheel to said shaft including segmental clutch members operatively connected to said driven shaft arranged radially around said bearing and adapted to be moved outwardly by centrifugal force to frictionally engage said flywheel.

13. In combination with a variable speed drive shaft, a driven shaft, an automatic transmission mechanism for connecting the driven shaft to the drive shaft at a predetermined speed of the drive shaft, including a centrifugal clutch, planetary gears connected to said clutch and said driven shaft, a planet carrier, a sun gear, forward and reverse anchor members one for said planet carrier and one for said sun gear, a control lever, and means actuated by said lever for positively locking either of said anchor members against rotation.

In testimony whereof I have signed this specification.

JESSE G. VINCENT.